M. N. KNUDSON.
SPRING CONTROL AND SHOCK ABSORBER FOR AUTOMOBILES.
APPLICATION FILED MAR. 3, 1917.
1,307,502.  Patented June 24, 1919.
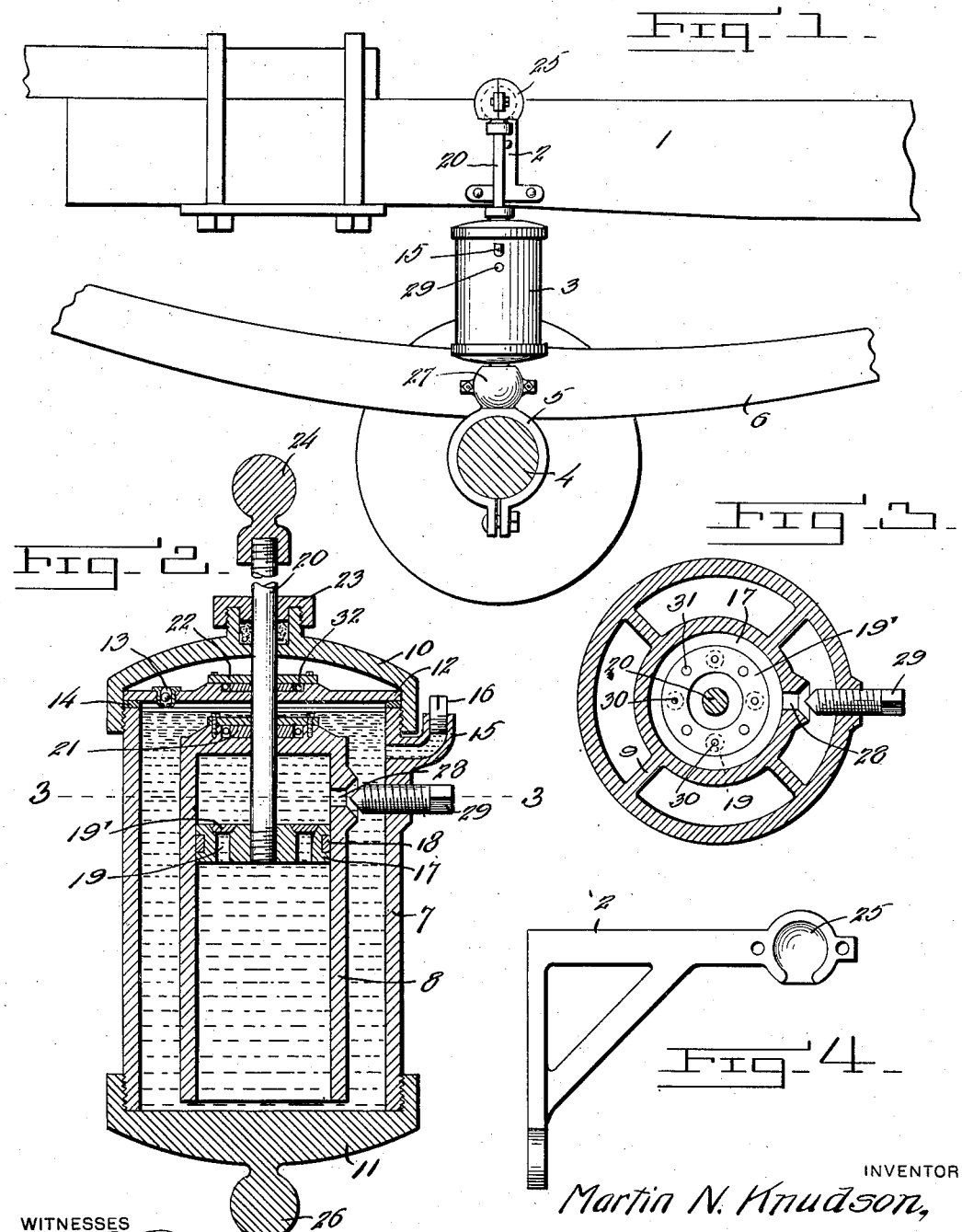
INVENTOR
Martin N. Knudson,
WITNESSES
BY
ATTORNEY

UNITED STATES PATENT OFFICE.

MARTIN N. KNUDSON, OF HOLLISTER, IDAHO, ASSIGNOR OF ONE-HALF TO A. E. CALDWELL, OF TWIN FALLS, IDAHO.

SPRING CONTROL AND SHOCK-ABSORBER FOR AUTOMOBILES.

1,307,502.  Specification of Letters Patent.  Patented June 24, 1919.

Application filed March 3, 1917. Serial No. 152,270.

*To all whom it may concern:*

Be it known that I, MARTIN N. KNUDSON, a citizen of the United States, residing at Hollister, in the county of Twin Falls and State of Idaho, have invented certain new and useful Improvements in Spring Controls and Shock-Absorbers for Automobiles, of which the following is a specification.

This invention relates to a shock absorber for automobiles and the like, of that class in which a body of liquid is trapped in a compartment and escapes under restraint, so as to offer a slowly yielding resistance to a movable part, acted on by the rebound of the spring.

The object of the invention is to provide an absorber that will quickly respond to every movement of the spring and that will act on either a short movement of the spring or a violent movement thereof.

A further object of the invention is to so mount the absorber as to allow free play of the movable parts.

The invention also consists in certain novel features of construction and in the combination and arrangement of the several parts to be more fully hereinafter described, pointed out in the claim and illustrated in the accompanying drawings, in which:

Figure 1 is a view showing the shock absorber in place on an ordinary automobile.

Fig. 2 is a longitudinal section through the absorber.

Fig. 3 is a section on the line 3—3 of Fig. 2.

Fig. 4 is a view of the upper bracket for connecting the absorber to the chassis.

In these drawings, 1 indicates part of the chassis carrying the bracket 2. 3 is the absorber secured to the rear axle 4 by the bracket 5, and 6 indicates the spring.

As shown in Fig. 2, the absorber comprises a casing 7, to which the cylinder 8 is secured by the ribs 9, said ribs holding the cylinder spaced from the casing as shown in Figs. 2 and 3. The casing is provided with a top 10 and a bottom 11, both screwed thereon. The cylinder is also provided with a slush head 12, having a return valve 13 therein.

14 is a packing ring below the slush head, said ring and head being held firmly in place by the head 10. 15 is a filling hole, closed by the plug 16.

17 is a piston located in the cylinder and provided with a piston ring 18 and ports 19, controlled by a valve plate 19'. This piston is carried by a rod 20 passing through the packing rings 21, 22 and 23, carried respectively by the cylinder head, the slush head and the casing. The piston rod carries a ball shaped head 24, which is adapted to engage with the socket 25 in the bracket 2. The bottom 11 of the casing is provided with a similar shaped head 26, which engages with the socket 27 on the bracket 5.

28 is a port located in the side of the cylinder adjacent the top thereof and said port is regulated by means of a screw plug 29 carried by the casing. The valve plate 19' is provided with ports 30. The valve plate 19' is also provided with guide pins 31 for guiding the same.

Any desired form of packing may be used but that shown, consists of overlapping metal packing held in place by the coil springs 32.

The casing is filled up to the level shown with a light oil, which also fills the cylinder.

When the car strikes a rough place in the road, the piston is lowered so that the oil passes from the low part of the cylinder through the piston ports into the upper part of the cylinder and then on the rebound of the spring the piston moves upwardly, which causes the valve 19' to close so that the oil above the piston offers a resistance to the movement thereof, as said oil slowly passes through the port 28 and the port 30. Thus the violent return movement of the spring is prevented.

Any oil escaping by the packing in the slush head will return to the casing by means of the valve 13.

It will be readily seen that the device may be adjusted to suit any weight of car by means of the screw plug 29 regulating the size of the port 28.

It is thought from the foregoing that the advantages and novel features of my invention will be readily comprehended.

I desire it to be understood that I may make slight changes in the construction and in the arrangement and combination of the several parts, provided such changes fall within the scope of the appended claim.

I claim as my invention:

A shock absorber comprising a casing containing a body of liquid, a cylinder arranged therein having its top closed and bottom open, and a port therein adjacent the top thereof, said cylinder being rigidly secured centrally within the casing and spaced a relatively large distance from the walls of the casing and having its bottom spaced a relatively small distance from the bottom of the casing, and a piston movable in the cylinder and provided with valve-controlled ports.

In testimony whereof I affix my signature in presence of two witnesses.

MARTIN N. KNUDSON.

Witnesses:
  ALBERT E. CALDWELL,
  JOHN WILLIAM McDONALD.